Patented Sept. 17, 1940

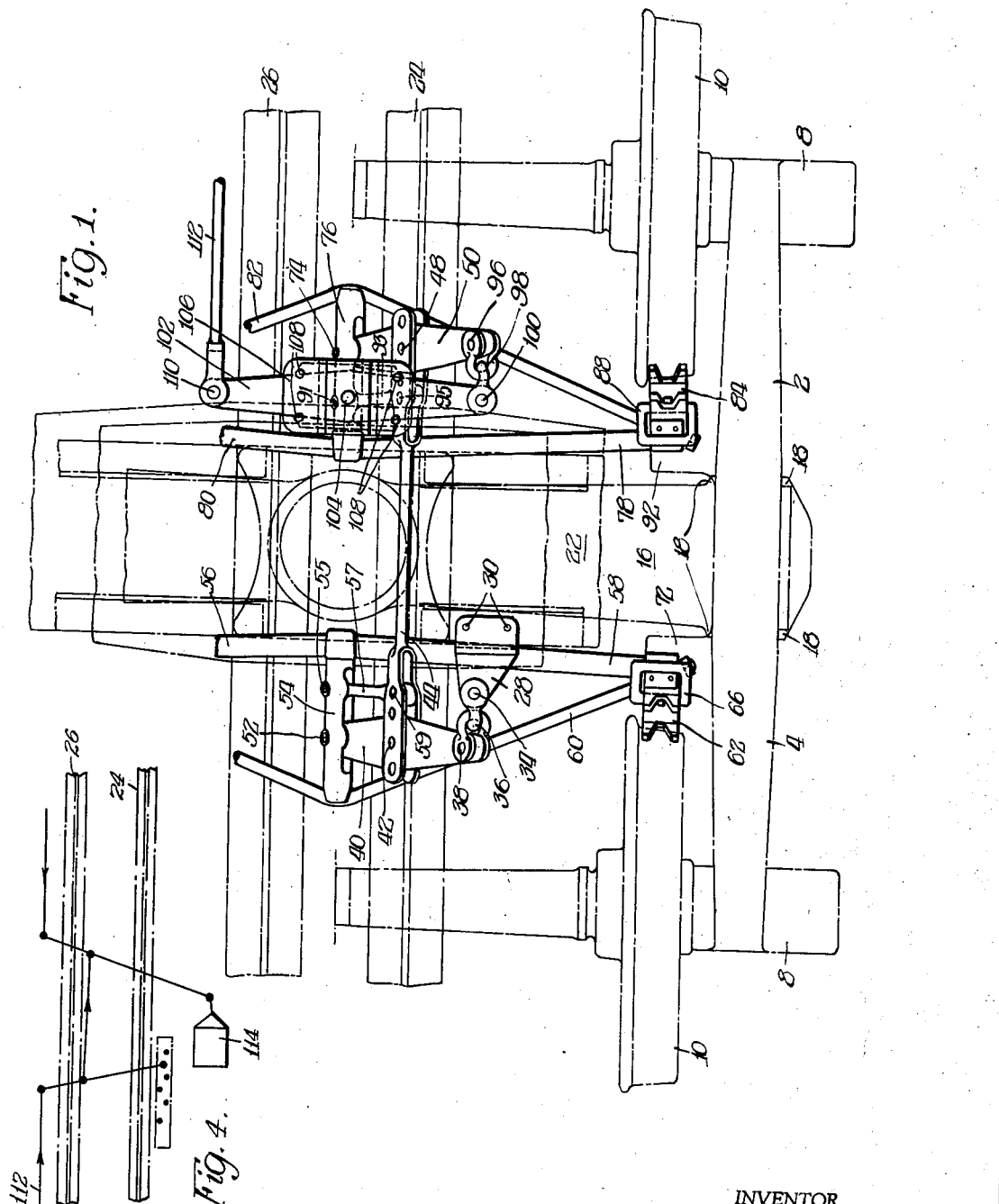

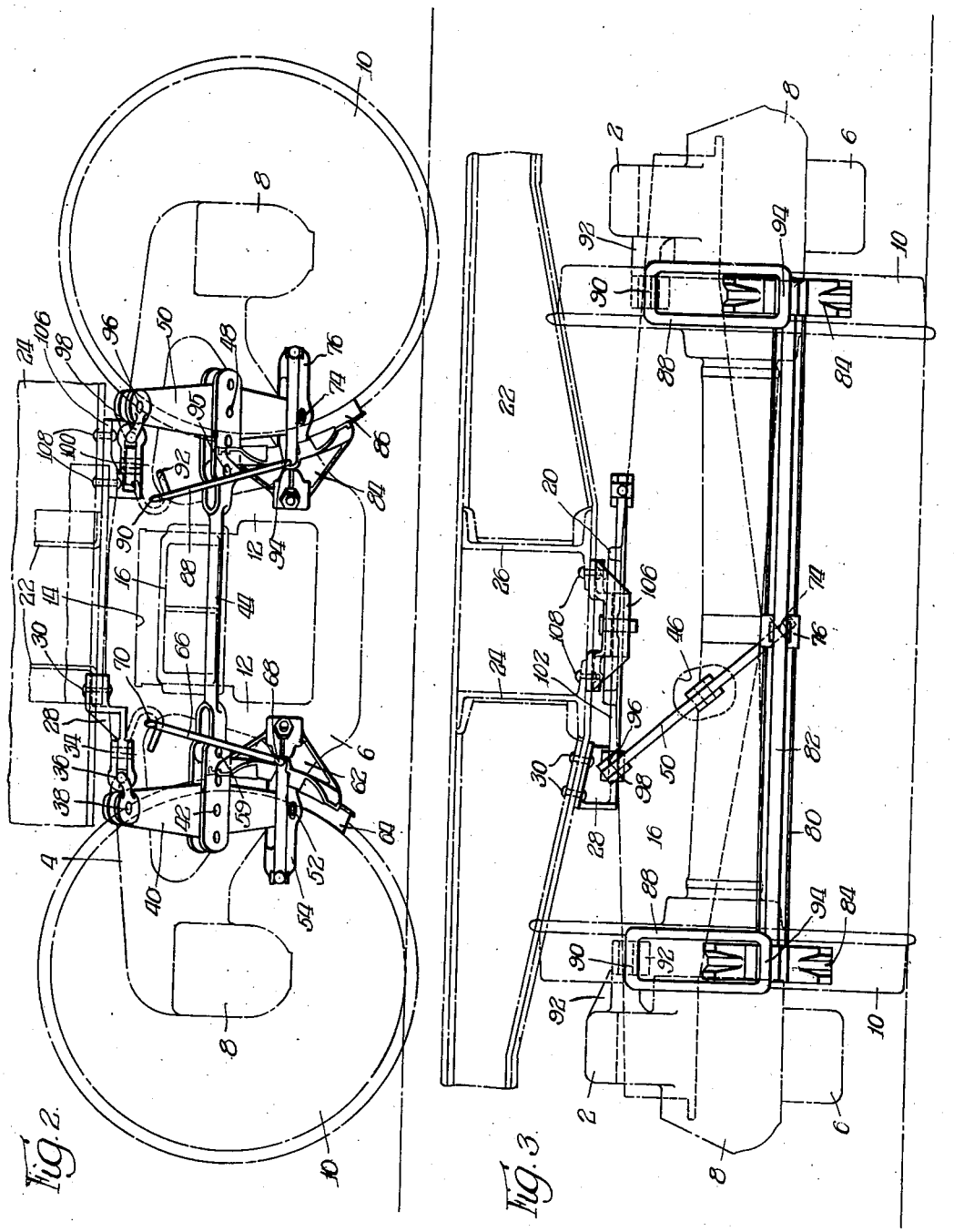

2,215,239

UNITED STATES PATENT OFFICE 2,215,239

BRAKE ARRANGEMENT

Walter H. Baselt, Chicago, Ill., assignor to American Steel Foundries, Chicago, Ill., a corporation of New Jersey Application November 7, 1938, Serial No. 239,195

20 Claims. (Cl. 188—52)

My invention relates to a novel form of braking means for a railway car truck and is particularly suitable for what is commonly designated a four wheel freight car truck.

The brake arrangement in favor at the present time for four wheel car trucks of the conventional type is a design wherein a compression rod operates through openings in the truck bolster with a live truck lever located at the outside of the truck, that is, at the end of the truck adjacent the end of the car body. The body rod connecting the live truck lever to the cylinder lever passes over the truck bolster and beneath the body bolster of the car body. In this construction difficulty is sometimes encountered owing to insufficient clearance for the body rod and in addition it necessitates the use of dissimilar live and dead levers associated with the beams at opposite ends of the truck inasmuch as the live lever must be lengthened to accommodate a connection with the body rod. Commonly, clearance conditions also necessitate bending one or both of these levers and although this is not a serious difficulty, complications sometimes occur in assembly and interferences result if the levers are improperly applied. In addition, the brake commonly in use asserts force against the truck bolster inasmuch as the dead truck lever is fulcrumed thereon, producing undesirable effects.

A particular object of my invention is to design a freight car truck brake which will obviate all of the above-mentioned difficulties and at the same time permit maximum simplicity. My novel arrangement avoids forces on the truck structure, allows the use of similar live and dead truck levers, and permits a connection to the brake cylinder on the car body without the use of a rod passing between the body bolster and the truck bolster.

Figure 1 is a top plan view of a truck and brake structure embodying my invention, said truck and brake structure being shown in conjunction with a fragmentary portion of an associated car body;

Figure 2 is a side elevation of the truck and brake structure shown in Figure 1;

Figure 3 is an end elevation thereof, the view being taken from the right as seen in Figures 1 and 2; and Figure 4 of reduced size is a diagrammatic showing of the manner in which the brake rigging is connected to the power means on the car body.

For the sake of simplicity certain parts have been omitted from each of these figures when better shown in others.

Describing my novel brake arrangement in detail, it may be observed that the truck comprises spaced side frames 2, 2 of well known truss type, each having a compression member 4, a tension member 6 merging adjacent their ends with the integrally formed journal boxes 8, 8 forming the usual means of connection with spaced supporting wheel and axle assemblies 10, 10. Integrally formed with the said tension and compression members are the spaced columns 12, 12 forming therebetween the window opening 14 through which may project the end of the truck bolster 16, the engagement between the bolster and the columns being secured in the usual manner by means of inner and outer guide lugs 18, 18. The end of the bolster may be seated upon any desired form of spring grouping (not shown), said spring grouping being positioned upon the tension member at the bottom of the window opening 14. The truck bolster 16 has the center bearing 20 forming the usual means of connection to the complementary center bearing formed on the body bolster 22, said body bolster forming a portion of the car body structure. Other portions of the car body are shown in the form of the usual spaced center sills 24 and 26.

My novel brake rigging comprises the dead lever bracket or fulcrum 28 (Figures 1 and 2, left) secured as at 30, 30 from the bottom wall or tension member 32 of the body bolster 22. Pivotally connected as at 34 to said bracket 28 is the clevis means 36, the opposite end thereof having a pivotal connection as at 38 to the upper and outer end of the dead truck lever 40. Intermediate the ends of the dead truck lever 40 is pivotally and adjustably connected as at 42 one end of the compression rod 44, which rod 44 extends through the opening 46 provided therefor in the walls of the bolster, the opposite end of said rod having a pivotal and adjustable connection as at 48 to the live truck lever 50. The lower end of the dead truck lever 40 has a pivotal connection as at 52 to the strut or fulcrum 54 associated with the beam 56, said beam having the compression member 58 and the tension member 60 joined at their ends in the usual manner, and carrying at its opposite ends the brake heads 62, 62 supporting the brake shoes 64, 64 for engagement with the peripheries of adjacent wheels. The brake beam 56 is supported at its opposite ends by hangers 66, 66, each of said hangers being pivotally connected at its lower end as at 68, 68 to the associated brake shoe 62, said hanger being pivotally supported at its upper end as at 70 from the brake hanger bracket 72 integrally formed with the side frame.

Balancing means for the beam 56 is afforded by a parallelogram arrangement wherein the link 57 has a pivotal connection at its lower end as at 55 with the strut 54 and a pivotal and adjustable connection at its opposite end as at 59 with the pull rod 44.

At the opposite end of the truck the lower end of the live truck lever 50 has a pivotal connection as at 74 to the fulcrum or strut member 76 of the truss type brake beam 78, said beam comprising the compression member 80 and the tension member 82 and supporting at its opposite ends brake heads 84, 84 mounting brake shoes 86, 86 in a position to engage the periphery of adjacent wheels. Hangers 88, 88 support the brake beam 78, each of said hangers being pivotally hung from its upper end as at 90 from the brake hanger bracket 92 and having a pivotal connection at its lower end as at 94 to the adjacent brake head 84.

The beam 78 has a balancing arrangement similar to that previously described for the beam at the opposite end of the truck with the link 93 pivotally connected at its lower end as at 91 to the strut 76 and pivotally and adjustably connected at its upper end as at 95 to the pull rod 44.

The upper end of the live truck lever 50 has a pivotal connection as at 96 to the clevis means 98, the opposite end of said clevis means having a pivotal connection as at 100 to the fulcrum lever 102, said fulcrum lever being pivoted intermediate its ends as at 104 from the fulcrum bracket 106 which is secured as at 108, 108 on the tension member 32 of the body bolster 22 centrally thereof. It may be noted that this compact and efficient arrangement is facilitated by locating both the fulcrum points 34 and 104 for the dead levers 40 and 102 respectively at points between the live truck lever 50 and the dead truck lever 40. The opposite end of the fulcrum lever 102 has a pivotal connection as at 110 to the pull rod 112 and said pull rod may be connected to the power means 114 normally supported on the car body through any convenient system of levers and pull rods, such, for example, as the conventional arrangement shown in Figure 4 wherein the said power means 114 is mounted centrally of the car body for operation of the rigging associated with the trucks at opposite ends of the car body.

In operation actuation of the power means on the car body moves the pull rod 112 to the right (Figure 1), thus rotating the fulcrum lever 102 in a clockwise direction and applying the brakes in a well known manner by actuation of the live truck lever 50 and, through the compression bar 44, the dead truck lever 40, said live and dead truck levers being associated with the beams at opposite ends of the truck.

To those skilled in the art it will be apparent that my novel brake arrangement results in no pull on the truck bolster; that it eliminates the body rod which commonly passes between the bolster of the car body and the truck bolster; further, that it provides in the live truck lever 50 the dead truck lever 40 similar structures, therefore interchangeable, and in many cases also permits the fulcrum lever 102 to be of similar size and shape to said live and dead truck levers; and furthermore that these levers are plain and require no bending or other forging process to accommodate the rigging to standard clearance conditions in the usual four wheel freight car truck.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway vehicle, a car body comprising an underframe, a four wheel truck having spaced side frames and a transverse load carrying member, supporting wheel and axle assemblies, spaced fulcrum means on said underframe intermediate said assemblies, and brake rigging for said truck in the form of hangers supporting truss type brake beams adjacent each of said assemblies, a dead truck lever fulcrumed from one of said means and connected to one of said beams, a live truck lever connected to the other of said beams, a compression bar connecting said live and dead truck levers, a fulcrum lever pivoted to the other of said means and having an end connected to said live truck lever, and means on said car body for operating said fulcrum lever.

2. In a railway vehicle, a car body having a center sill and a body bolster, a supporting truck in the form of spaced side frames and a transverse load carrying member, spaced wheel and axle assemblies, fulcrum means on said sill and said body bolster at opposite sides of said load carrying member intermediate said assemblies, and brake rigging comprising truss type beams with center struts supported from said frames adjacent each assembly, interconnected live and dead truck levers having their lower ends connected to said struts respectively, said dead truck lever having its upper end fulcrumed from one of said means, and operating means on said car body for operating said live truck lever, said operating means including a dead lever fulcrumed from the other of said fulcrum means and connected to the upper end of said live truck lever.

3. In a railway vehicle, a car body having a center sill and a body bolster, a fulcrum lever pivoted to said sill, a supporting four wheel truck in the form of spaced truss type side frames and a transverse load carrying member, spaced wheel and axle assemblies, truss type beams with struts supported from said side frames adjacent each assembly, live and dead truck levers having their lower ends connected to said struts respectively and points intermediate their ends connected to each other, said dead truck lever being fulcrumed from said body bolster and said live truck lever having its upper end connected to said fulcrum lever, and means for operating said fulcrum lever, the pivot point of said fulcrum lever and the fulcrum point of said dead lever being located intermediate said assemblies.

4. In a railway vehicle, a car body having an underframe, a supporting truck having spaced side frames and a transverse load carrying member, wheel and axle assemblies, spaced fulcrum means on said underframe intermediate said assemblies at opposite sides of said load carrying member, braking means for said wheels including brake beams supported adjacent each assembly, truck levers having their lower ends connected to said beams respectively and points intermediate their ends connected to each other, one of said truck levers being fulcrumed from said one of said fulcrum means, and means on said underframe for operating the other of said truck levers, the connection between said truck levers being in the form of a compression bar extending through said transverse load carrying member and having clearance therefrom, said operating means comprising a horizontal lever fulcrumed intermediate its ends from the other of said fulcrum means and connected at one end to said other truck levers.

5. In a railway vehicle, a car body having an underframe, a supporting truck with spaced side frames and a transverse load carrying member, spaced wheel and axle assemblies, and braking means including brake beams with center struts supported from said side frame adjacent each assembly, truck levers having their lower ends connected to said struts respectively, a compression bar interconnecting said levers, one of said truck levers being fulcrumed from said underframe adjacent one side of said load carrying member, means on said underframe for operating the other of said truck levers, said means comprising a dead lever fulcrumed from said underframe adjacent the other side of said load carrying member, and balancing means for each of said beams in the form of a link connected between the strut of said beam and the adjacent end of said compression bar, both of said fulcrum points on said underframe being located intermediate said wheel and axle assemblies.

6. In a railway car, a body framework comprising a center sill and a body bolster, a four wheel railway truck including spaced side frames and a transverse load carrying member, supporting wheel and axle assemblies, and brake rigging for said truck in the form of brake beams supported adjacent each of said assemblies, interconnected live and dead truck levers connected to said beams respectively, said dead truck lever being fulcrumed from said body bolster adjacent one side of said load carrying member intermediate said assemblies, a fulcrum lever pivoted to said center sill adjacent the other side of said load carrying member intermediate said assemblies, said live truck lever having its upper end connected to said fulcrum lever, and means on said car body for operating said fulcrum lever.

7. In a railway car, a body framework comprising a center sill and a body bolster, a four wheel railway truck including spaced side frames and a transverse load carrying member, supporting wheel and axle assemblies, and brake rigging for said truck in the form of brake beams supported adjacent each of said assemblies, interconnected live and dead truck levers connected to said beams respectively, said dead truck lever being fulcrumed from said body bolster adjacent one side of said load carrying member intermediate said assemblies, and means on said car body for operating said live truck lever, said means comprising a dead lever fulcrumed from said center sill adjacent the other side of said load carrying member intermediate said assemblies and connected to the upper end of said live truck lever.

8. In a railway vehicle, a car body having a center sill and a body bolster, a supporting truck in the form of spaced side frames and a transverse load carrying member, spaced wheel and axle assemblies, and brake rigging comprising truss type beams with struts supported from said frames adjacent each assembly, interconnected live and dead truck levers associated with said beams respectively, said dead truck lever being fulcrumed from said body bolster, and means on said car body for operating said live truck lever, said operating means including a dead lever fulcrumed intermediate its ends from said center sill and connected to said live truck lever.

9. In a railway vehicle, a car body having an underframe, a supporting truck having spaced side frames and a transverse load carrying member, wheel and axle assemblies, braking means for said wheels including brake beams supported adjacent each assembly, truck levers having their lower ends connected to said beams respectively and points intermediate their ends connected to each other, one of said truck levers being fulcrumed from said underframe, and means on said underframe adjacent one side of said load carrying member intermediate said assemblies for operating the other of said truck levers, said means including a dead lever fulcrumed from said underframe at a point intermediate said assemblies adjacent the opposite side of said load carrying member.

10. In a railway vehicle, a car body, a supporting truck comprising spaced side frames, a transverse bolster and spaced wheel and axle assemblies, and braking means comprising a truss beam supported adjacent each assembly, fulcrum means on said car body at opposite sides of said bolster intermediate said assemblies, live and dead truck levers having their lower ends connected to the struts of respective beams and connected intermediate their ends to each other, said dead truck lever being dead-ended from one of said fulcrum means, and an operative lever pivoted intermediate its ends to the other of said fulcrum means and connected to said live truck lever.

11. In a railway vehicle, a car body, a supporting truck comprising spaced side members, a transverse member, supporting wheel and axle assemblies, braking means for said truck including a truss beam supported adjacent each assembly, fulcrum means on said car body at opposite sides of said transverse member intermediate said assemblies, live and dead truck levers connected at their lower ends to said beams respectively, and connected intermediate their ends to each other, said dead truck lever being connected to one of said fulcrum means, and operating means for said live truck lever in the form of a lever fulcrumed intermediate its ends from the other of said fulcrum means and connected at one end to said live truck lever.

12. In a railway vehicle, a car body, a supporting truck comprising spaced side members, a transverse member, and supporting wheel and axle assemblies, braking means for said assemblies including a truss beam supported adjacent each assembly, interconnected live and dead truck levers connected at their lower ends respectively too said beams, said dead truck lever being fulcrumed from said car body at one side of said transverse member intermediate the wheels, and means for operating said live truck lever comprising an operating lever fulcrumed intermediate its ends from said car body adjacent the other side of said transverse member intermediate the wheels and connected at one end to said live truck lever.

13. In a railway vehicle, a car body, a supporting truck comprising a transverse load carrying member and spaced wheel and axle assemblies at opposite sides thereof, fulcrum means on said car body at opposite sides of said transverse member, and braking means for said wheels in the form of a brake beam associated with each assembly, interconnected live and dead truck levers connected at their lower ends to said beams respectively, said dead truck lever being fulcrumed from one of said fulcrum means, and means pivoted in the other of said fulcrum means for operating said live truck lever, said operating means comprising a dead lever connected at one end to said live truck lever and operatively connected at its opposite end to power means.

14. In a railway vehicle, a car body, a supporting truck comprising spaced wheel and axle assemblies and a transverse load carrying member, fulcrums on said car body intermediate said assemblies and adjacent opposite sides of said transverse load carrying member, braking means for said wheels including a truss beam supported adjacent each assembly and including a center strut, live and dead truck levers fulcrumed at their lower ends from said struts respectively and adjustably connected intermediate their ends by a compression bar, said dead truck lever being connected to one of said fulcrum means, and an operating lever pivoted intermediate its ends in the other of said fulcrum means and connected at one end of said live truck lever.

15. In a railway vehicle, a car body, a supporting truck comprising spaced wheel and axle assemblies and a transverse load carrying member, fulcrums on said car body intermediate said assemblies and adjacent opposite sides of said transverse load carrying member, braking means for said wheels including a truss beam supported adjacent each assembly and including a center stut, live and dead truck levers fulcrumed at their lower ends from said struts respectively and adjustably connected intermediate their ends by a compression bar, said dead truck lever being connected to one of said fulcrum means, and an operating lever pivoted intermediate its ends in the other of said fulcrum means between said live and dead truck levers and connected at one end of said live truck lever for operation thereof.

16. In a railway vehicle, a car body, a supporting truck comprising spaced side frames, a transverse bolster and spaced wheel and axle assemblies, and braking means comprising a truss beam with a center strut supported adjacent each assembly, live and dead truck levers having their lower ends connected to said strut respectively and connected intermediate their ends to each other, a plurality of fulcrum means supported at points between said live and dead truck levers, said dead lever being dead ended from one of said fulcrum means, and an operating lever pivoted intermediate its ends from the other of said fulcrum means and connected at one end to said live truck lever and at its opposite end to power means for actuation thereof.

17. In a railway vehicle, a car body, a supporting truck comprising spaced side members, a transverse member and supporting wheel and axle assemblies, braking means for said truck comprising truss beams with center struts supported adjacent said assemblies, a dead truck lever connected at its lower end to the beam associated with said assembly adjacent the end of said car body, a live truck lever connected to the beam associated with the assembly adjacent the middle of said car body, said live and dead truck levers being connected to each other at points intermediate their ends, a plurality of fulcrum points supported intermediate said live and dead truck levers, said dead truck lever being fulcrumed from one of said fulcrum points and an operating lever pivoted to the other of said fulcrum points and connected at one end to said live truck lever, and means on said car body for actuating said operating lever.

18. In a railway car truck, a car body, a supporting truck comprising spaced side frames, a transverse load carrying member, and supporting wheel and axle assemblies, braking means for said truck comprising a truss beam with a center strut supported adjacent each assembly, live and dead truck levers connected at their lower ends to said struts and at points intermediate their ends to each other, said dead truck lever being located at the side of said truck adjacent the end of said car body and said live truck lever at the side of said truck toward the middle of said car body, spaced fulcrums supported intermediate said live and dead truck levers, said dead truck lever being connected to one of said fulcrums, an operating lever pivoted intermediate its end to the other of said fulcrums and connected at one end to said live truck lever, and means on said car body for actuating said operating lever.

19. In a railway car truck, a car body, a supporting truck comprising spaced side frames, a transverse load carrying member, and spaced wheel and axle assemblies, brake rigging for said truck comprising a truss beam supported adjacent each assembly at opposite sides of said load carrying member, live and dead truck levers connected at their lower ends to said beams respectively and connected to each other, said dead truck lever being connected to the beam adjacent the end of said car body and said live truck lever connected to the beam adjacent the middle of said car body, a plurality of fulcrums supported at points intermediate said live and dead truck levers, said dead truck lever being dead ended at one of said fulcrums, and an operating lever pivoted in the other of said fulcrums and connected at one end to said live truck lever and operatively connected at its opposite end to actuating means on said car body.

20. In a railway car truck, a car body, power means supported adjacent the middle of said car body, a supporting truck comprising spaced side frames, a connecting bolster, and supporting wheel and axle assemblies, and brake rigging for said assemblies comprising a beam associated with each assembly, live and dead truck levers connected at their lower ends to said beams respectively and connected intermediate their ends to each other, said dead truck lever being connected to the beam associated with the assembly adjacent the end of said car body, a plurality of fulcrums supported intermediate said live and dead truck levers, one of said fulcrums affording a dead end for said dead truck lever, an operating lever pivoted in the other of said fulcrums and connected to said live truck lever, and an operative connection between said power means and said operating lever.

WALTER H. BASELT.

CERTIFICATE OF CORRECTION.

Patent No. 2,215,239.  September 17, 1940.

WALTER H. BASELT.

It is hereby certified that error appears in the printed specification of the above numbered patent requiring correction as follows: Page 2, second column, line 68, claim 4, strike out the word "said" first occurrence; page 3, second column, lines 7 and 8, claim 9, strike out the comma and words ", and means on said underframe" and insert the same after "assemblies" in line 9, same claim; line 52, claim 12, for "too" read --to--; page 4, first column, line 27, claim 15, for "stut" read --strut--; and that the said Letters Patent should be read with this correction therein that the same may conform to the record of the case in the Patent Office.

Signed and sealed this 21st day of January, A. D. 1941.

(Seal)

Henry Van Arsdale,
Acting Commissioner of Patents.